United States Patent [19]

Kondo et al.

[11] Patent Number: 5,500,169

[45] Date of Patent: Mar. 19, 1996

[54] METHOD AND DIE APPARATUS FOR PRODUCING PLASTIC MOLDING HAVING FOAM WITH SKIN

[75] Inventors: Tetsuo Kondo; Akihiko Murakami, both of Anjo, Japan

[73] Assignee: Kabushiki Kaisha Inoac Corporation, Aichi, Japan

[21] Appl. No.: 337,433

[22] Filed: Nov. 8, 1994

[30]  Foreign Application Priority Data

May 27, 1994 [JP] Japan ................................ 6-138320

[51] Int. Cl.⁶ ............................ B29C 65/00; B29C 65/78
[52] U.S. Cl. ...................... 264/46.5; 264/46.6; 425/112; 425/817 R
[58] Field of Search .................... 264/45.2, 46.4, 264/46.5, 46.6, 112; 425/4 R, 817 R

[56] References Cited

U.S. PATENT DOCUMENTS 4,793,784  12/1988  Belleville et al. ....................... 425/111
5,006,288   4/1991  Rhodes, Jr et al. ................... 264/46.6

*Primary Examiner*—Robert A. Dawson
*Assistant Examiner*—Kenneth M. Jones
*Attorney, Agent, or Firm*—Armstrong, Westerman, Hattori, McLeland & Naughton

[57] ABSTRACT

A method for producing a plastic molding having a foam with a skin on an outer surface of a core wherein a foaming material is foamed in a space defined between a skin member and the core, disposed within a molding die assembly having an upper die and a lower die includes disposing the skin member which is provided with side portions and recessed grooves at the edge portions thereof, on the lower die of the molding die assembly; fitting edge holders projecting from the lower die into the recessed grooves of the skin member; disposing the core which is provided with a recess in which the skin member is received, in the molding die assembly; pouring the foaming material in a space between the skin member and the bottom surface of the core to foam the foaming material; and retracting the edge holders into the lower die during the foaming before the foaming operation is completed. The disclosure is also directed to a molding die apparatus for producing such a plastic molding.

10 Claims, 5 Drawing Sheets

METHOD AND DIE APPARATUS FOR PRODUCING PLASTIC MOLDING HAVING FOAM WITH SKIN

BACKGROUND OF THE INVENTION

1. Field of the Invention

The present invention relates to a method for producing a plastic molding which is provided on an outer surface thereof with a foam with a skin and foaming die apparatus for producing the same.

2. Description of the Related Art

For instance, a conventional instrument panel for an automobile is usually made of a core 93 which is provided on a part or entirety of the outer surface thereof with a pad comprising a foam 91 with a skin, from an protective or decorative viewpoint, as shown in FIG. 10.

There are known methods for producing such a plastic molding product having on the outer surface thereof an outer foam with a skin.

For instance, a foam with a skin (foam assembly), made of laminated layers of a mounting base, a foaming member, and an outer skin is prepared in advance and the foam assembly thus prepared is secured to the core by screws or the like at predetermined positions.

In another known method, an outer skin member which is provided on the outer periphery thereof with an edge (skirt) is disposed on a die surface of a lower die with the skirt being located on the outer periphery of the molding cavity of the lower die; and a core is disposed on a die surface of an upper die. When the upper and lower dies are brought into an operative position, the skirt is held between the upper and lower dies. In this state, a foaming material is poured and foamed between the core and the outer skin member. The skirt is finally cut and removed.

However, in the former method, an additional process to secure the foam assembly to the core is necessary. Moreover, since the molding obtained includes the heavy mounting base of the foam assembly which is usually made of a steel plate, the molding is heavy as a whole. In addition to the foregoing, a clearance tends to be produced at a boundary portion of the peripheral edge of the foam assembly and the core, thus leading to a poor appearance of the product.

In the latter method, the foaming material tends to flow onto the outside of the molding through the skirt of the outer skin member, thus resulting in a formation of a flash. Furthermore, an additional process to cut and remove the skirt is needed. The residual foaming material on the skirt that has been cut makes it difficult to reuse the skirt, thus resulting in a waste of the material.

SUMMARY OF THE INVENTION

It is an object of the present invention to provide a simple method and die apparatus for producing a light plastic molding with a skin, having no or little clearance at a boundary portion between a foam with a skin and a core so as to provide a good appearance, wherein no leakage or flow of a foaming material onto an outer surface of the product occurs and wherein a waste of the skin material is improved.

To achieve the object mentioned above, according to a first aspect of the present invention, there is provided a method for producing a plastic molding having a foam with a skin on an outer surface of a core wherein a foaming material is foamed in a space defined between a skin member and the core, disposed within a molding die assembly having an upper die and a lower die, comprising the steps of disposing the skin member which is provided with side portions and recessed grooves at the edge portions thereof, on the lower die of the molding die assembly, and fitting edge holders projecting from the lower die into the recessed grooves of the skin member to hold the latter; disposing the core which is provided with a recess in which the skin member is received, on the die surface of the upper die of the molding die assembly; pouring the foaming material in a space between the skin member and the bottom surface of the core to foam the foaming material; and retracting the edge holders into the lower die during the foaming before the foaming operation is completed.

According to another aspect of the present invention, there is provided an apparatus for producing a plastic molding including a lower die on which a skin member which is provided with side portions formed by bending the end portions of the skin member backward and recessed grooves at the edge portions thereof, formed by bending the end portions of the side portions forward is disposed, and an upper die on which a core which is provided with a recess in which the skin member is received is disposed, wherein a foaming material is poured and foamed between the skin member and the bottom surface of the core, comprising edge holders provided in the lower die having a die surface, said edge holders being provided with holding members which can be selectively fitted in the recessed grooves of the skin member to hold the latter, so that the holding members can be projected from and retracted into the die surface of the lower die.

Contrary to the present invention mentioned above, if a skin member 82 is provided with side portions 81 which are formed by merely bending the end portions of the skin member backward, namely if the skin member 82 has no recessed groove, as shown in FIG. 9, an accidental displacement of the skin member 82 tends to occur when the skin member 82 is set in the molding die assembly 83 or when the skin member 82 is received in the recess 87 of the core 86 due to an absence of the skirt.

Moreover, since the skin member 82 is usually made of a flexible material, such as a plastic sheet, the side portions 81 of the skin member 82 which are formed by bending the end portions thereof backward has less self-shape maintaining property, so that the side portions 81 can be easily fallen or bent particularly at the ends thereof due to the dead weight thereof or the heat of the molding die assembly 83. Furthermore, in an instrument panel, in general, the foam 91 with a skin is smoothly curved in a convex-shape toward forward. To this end, the die surface 85 of the lower die on which the skin 82 is to be disposed is smoothly curved accordingly, so that the edges of the die surface 85 are turned upward. Consequently, the side portions 81 of the skin member 82 can be more easily fallen inward.

Therefore, if the skin member 82 having no recessed groove at the edges of the side portions 81 is used, no seal arrangement can be established between the side portions 81 of the skin member 82 and the corresponding side walls 88 of the core 86, due to the abovementioned accidental displacement of the skin member or the accidental falling of the side portions 81 thereof. This causes the foaming material to flow out through the defective seal or causes a wrinkling at the edge of the skin member, thus resulting in a poor or unacceptable appearance of the molding (product).

Conversely, in a producing method according to the present invention, since edge holders which are projected from the die surface of the lower die are fitted at the free ends (front or upper ends) thereof in the recessed grooves of the skin member to firmly hold the side portions of the skin member, no accidental displacement or falling of the skin occurs.

In the present invention, the internal pressure in the cavity defined between the skin member and the bottom surface of the core is increased due to the continuing reaction of the foaming material which is poured in the cavity, so that the side portions of the skin member are pressed against the corresponding side walls of the core. During an increase of the internal pressure, the side portions of the skin member are continuously and firmly held by the edge holders, and accordingly, even a partial falling of the side portions does not take place. Consequently, no flow or leakage of the foaming material over the side portions of the skin member onto the outer surface of the latter occurs.

Since the edge holders are retracted in the lower die from the die surface thereof during the foaming process, the side portions of the skin member are pressed against and come into close contact with the corresponding side walls of the core without interfering with the edge holders to thereby establish a seal mechanism therebetween. Consequently, the cavity between the surface of the skin member and the recessed bottom surface of the core is filled with the foam which does not leak or flow out through the boundary portion of the side portions of the skin member and the corresponding side walls of the core. Thus, an integral plastic molding of the core and the foam with the skin can be obtained.

Furthermore, since the side portions of the skin member are pressed against and come into close contact with the corresponding side walls of the core when the edge holders are retracted into the lower die from the die surface thereof, there is no or little gap between the side portions of the skin member and the side walls of the core. The plastic molding thus obtained is considerably light owing to an absence of a mounting base of the core that has been indispensable in a plastic molding of the prior art as mentioned above.

BRIEF DESCRIPTION OF THE DRAWINGS

The invention will be described below in detail with reference to the accompanying drawings, in which.

DESCRIPTION OF THE PREFERRED EMBODIMENT

Figure 1:
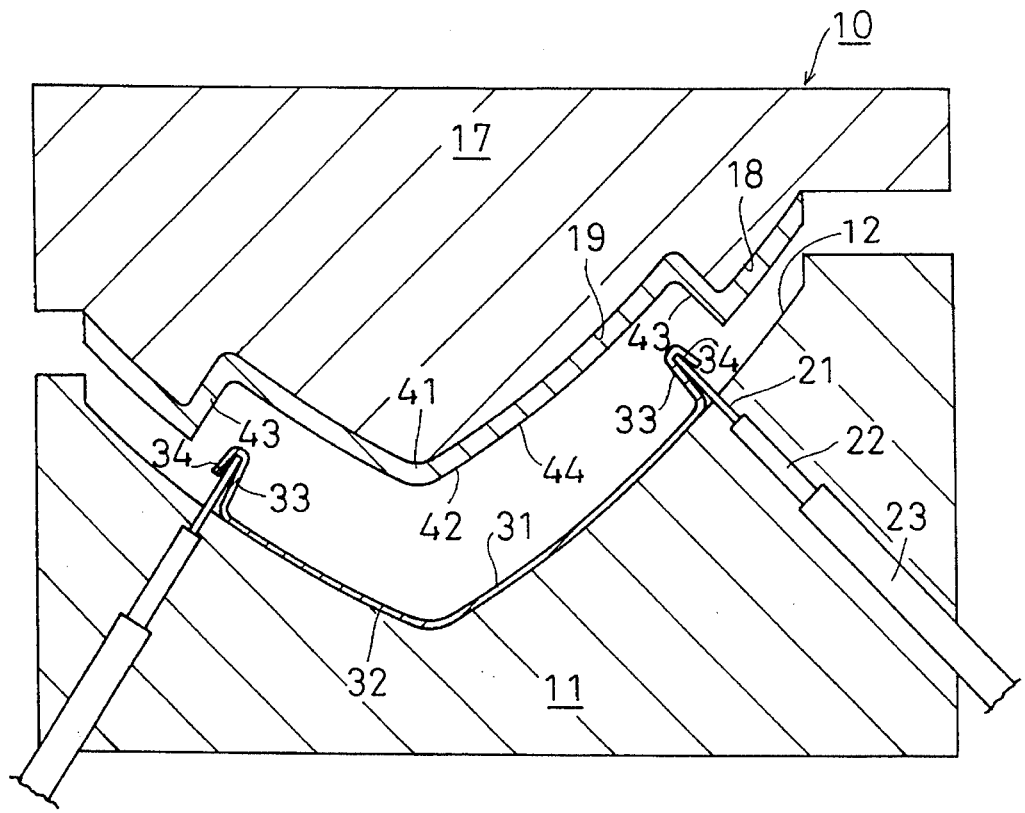
FIG. 1 is a sectional view of a foaming and molding die assembly in which a skin member and a core are disposed, according to the present invention.

The illustrated embodiments which will be discussed below are applied to a plastic molding for an instrument panel, but are not limited thereto.

The foaming and molding die assembly (die apparatus) 10 is comprised of a lower die 11 and an upper die 17. The lower die 11 is provided with a die surface 12 on which a skin member can be disposed, and edge holders 21 which can be selectively projected from and retracted into the die surface 12 to hold opposed edges of the skin member 31. The edge holders 21 are each in the form of a plate or pin, so that the front ends of the edge holders 21 can be fitted in corresponding recessed grooves 34 of the skin member 31 which is disposed on the die surface 12 of the lower die 11 to hold the end edges of the skin member during the foaming/molding process. In the illustrated embodiments, the edge holders 21 are respectively connected to piston rods (operating members) 22 which is moved by hydraulic or pneumatic cylinder devices (actuators) 23 so as to retractably project from the die surface 12 into the molding cavity defined between the upper and lower dies. The hydraulic or pneumatic cylinder devices 23 is connected to an hydraulic pump or pneumatic pump (not shown). It is preferable that a predetermined number of edge holders 21 are provided so as to uniformly hold the entire periphery of the skin member. If it is difficult to uniformly support the entire periphery of the skin member depending on the shape of the product (molding), the edge holders 21 are provided preferably at least at the side portions of the skin member that tend to fall or be inclined.

The thickness or diameter of the edge holders 21 is such that the front ends of the edge holders can be fitted in the recessed grooves 34 of the skin member 31 and is usually approximately 1 to 2 mm. The length of the projecting portions of the edge holders 21 from the die surface 12 depends on the shape of the product (molding) and is usually approximately 6 to 10 mm.

The upper die 17 is provided with a die surface 18 on which the core 41 can be disposed. The die surface 18 is provided with a recessed surface 19 in which the recessed portion 42 of the core 41 is located. A core holder (not shown) is usually provided on the die surface 18. The core holder is constituted, for example, by a hole (or holes) in which a mounting clip (or clips) provided on the core 41 can be engaged or by a core holding pin (or pins) projecting from the die surface 18, etc.

Figure 2:
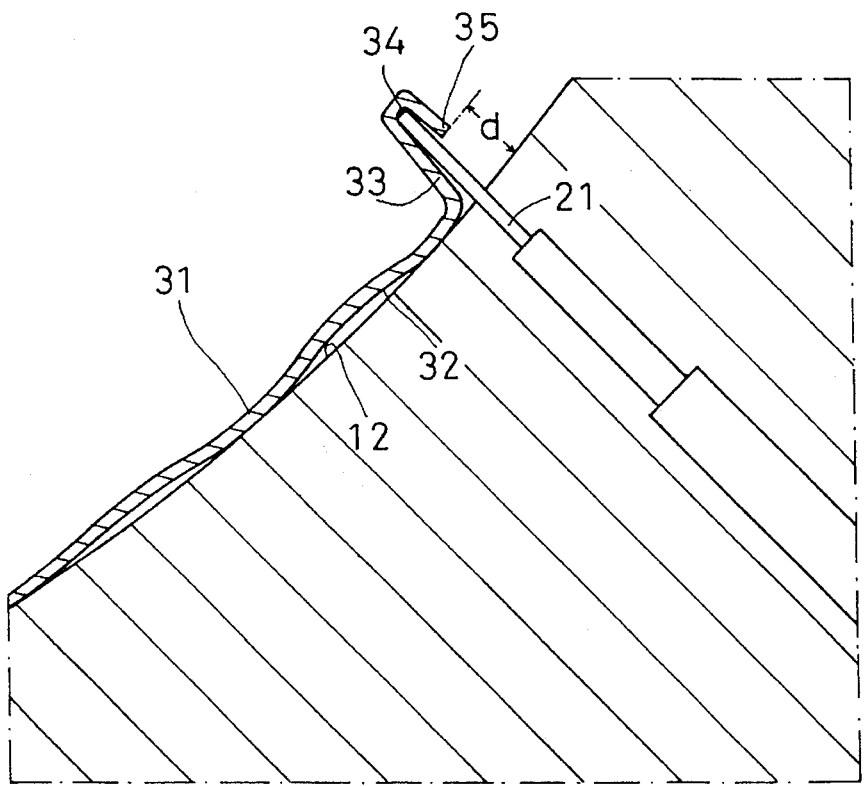
FIG. 2 is an enlarged sectional view of a main part of FIG. 1.

The skin member 31 to be used in the illustrated embodiment is made of an impermeable material, such as a leather-like plastic sheet or plate or a fabric sheet or plate whose rear surface is coated with a plastic or banded with a plastic film, and can be molded in a predetermined shape by a powder-slush molding or a vacuum forming, per se known. The skin member 31 whose front surface 32 constitutes an outer surface of the molding is provided with the opposed ends that are bent backward to form side portions 33 of the molding. The ends of the side portions 33 are turned forward to form the recessed grooves 34. The side portions of the skin can be molded at the same when the skin is malded in a predetermined shape. As can be seen in FIG. 2, the length of the open ends 35 of the recessed grooves 34 is such that there is a gap between the open ends 35 and the front surface 32 of the skin member 31. Namely, the distance "d" between the open ends 35 and the front surface 32 of the skin member 31 is usually 3 to 7 mm. Consequently, when the side portions 33 are brought into close contact with side walls 43 of the core 41, as will be discussed below, the open ends 35 are confined between the side portions 33 of the skin member 31 and the side walls 43 of the core 41 and accordingly not exposed to the outside of the molding. This contributes to an improvement of an aesthetic appearance of the product.

The core 41 to be used in the illustrated embodiment is made of a self-shape maintaining material, e.g., a rigid plastic, such as acrylonitrile-butadiene-styrene (ABS) resin, polypropylene, polyphenylene oxide or fiber-reinforced plastic. The core 41 is partly recessed in the direction opposite to the skin 31 to form the recessed portion 42 which is defined by the side walls 43 and the bottom surface 44, as mentioned above. The recessed portion 42 receives therein the foaming material P, which will be discussed hereinafter. The shape of the recessed portion 42 is optionally determined depending on the purpose of usage of the molding or from the aesthetic viewpoint, etc.

The skin member 31 is set on the die surface 12 of the lower die 11, so that the back surface is oriented upward in FIG. 1. The core 41 is set on the die surface 18 of the upper die 17. The front ends (upper ends) of the edge holders 21 that project upward from the die surface 12 of the lower die 11 are fitted in the corresponding recessed grooves 34, so that the side portions 33 are maintained upright. Preferably, the skin member 31 is loosely disposed on the die surface 12, as can be seen in FIG. 2, so that when the edge holders 21 are retracted into the lower die 11 from the die surface 12, the skin member 31 is stretched due to the foaming pressure, i.e., the internal pressure within the closed space between the core and the skin member, which is generated and increased by foaming (continuing reaction) of the foaming material. As a result, the side portions 33 of the skin member 31 can be brought into close contact with the associated side walls 43 of the recess 42 of the core 41.

Note that the core 41 is disposed on the die surface 18 of the upper die 17 with the recess 42 being fitted in the recess 19 of the die surface 18 of the upper die 17 and is held by a core holder (not shown), as mentioned above.

Figure 3:
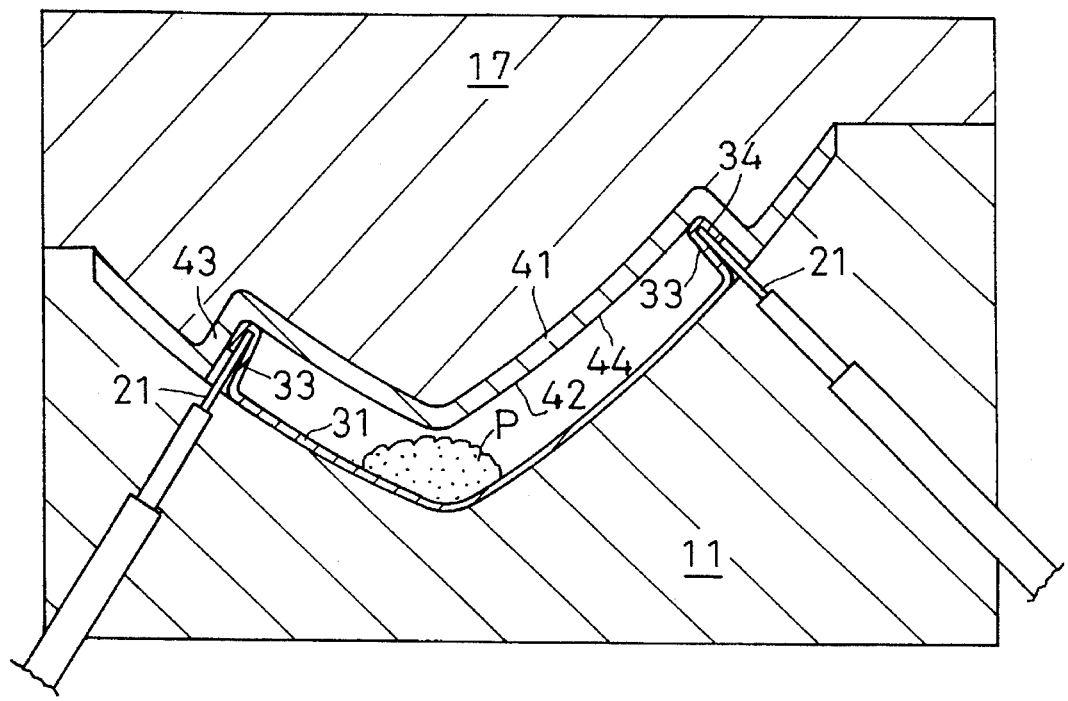
FIG. 3 is a sectional view of a foaming and molding die assembly in which a foaming material is deposited between a skin member and a core.

Thereafter, the reactive foaming material P, comprising reactive ingredients such as polyurethane composition is poured in a space within the skin member 31, as shown in FIG. 3. Thereafter, the lower and upper dies 11 and 17 are closed to define a foaming and molding cavity therebetween. Consequently, the skin member 31 closes or covers the open space of the recess 42 of the core 41. In this state, it should be appreciated that the side portions 33 of the skin member 31 are maintained upright with respect to the surface 32 of the skin member 31 by the edge holders 21 that are fitted in the recessed grooves 34 of the skin member 31 without being fallen inward or outward.

Figure 4:
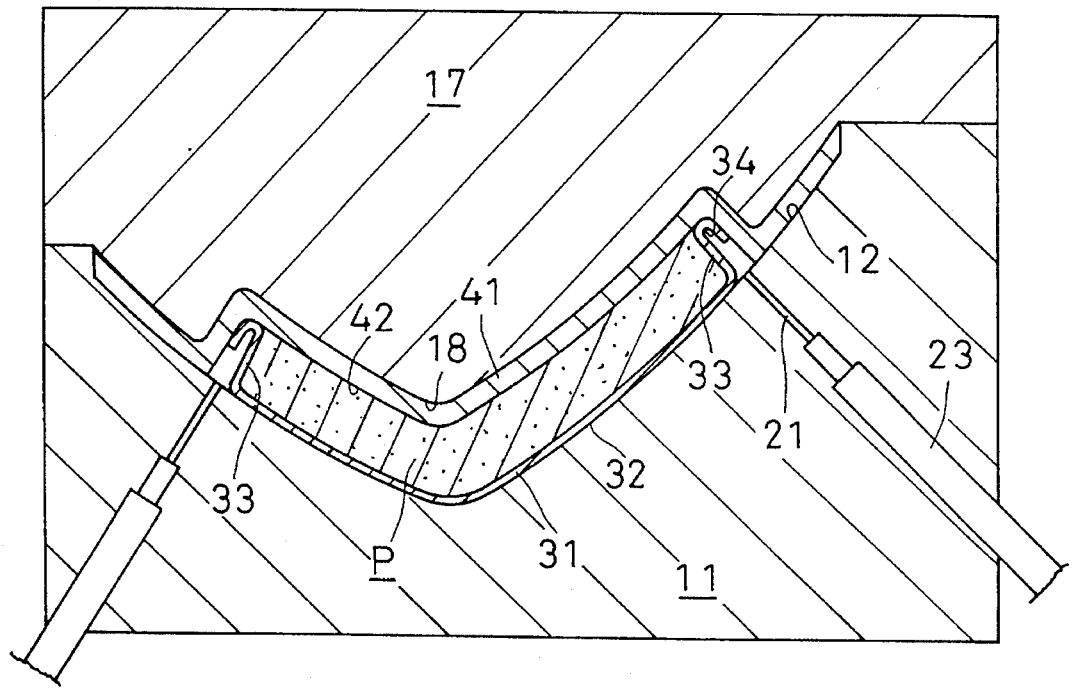
FIG. 4 is a sectional view of a foaming and molding die assembly in which edge holders holding edges of an outer skin member are retracted within a lower die during the foaming process.
Figure 5:
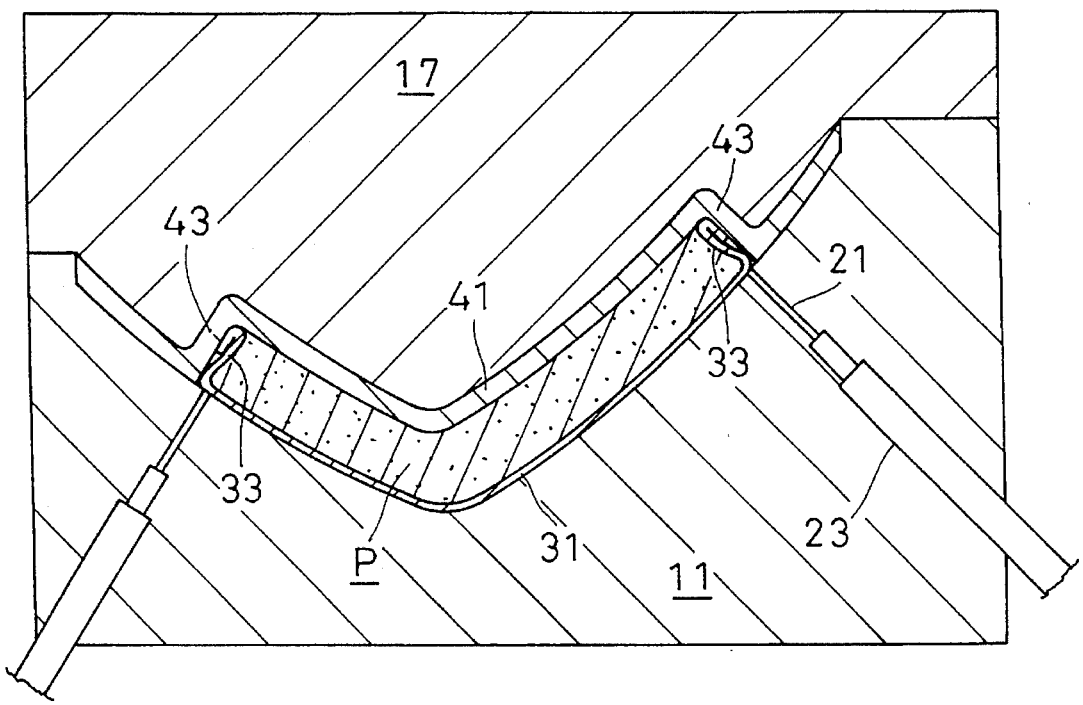
FIG. 5 is a sectional view similar to FIG. 4, shown in a completion position in which the foaming process is completed.

When the foaming material P is foamed, the side portions 33 of the skin member 31 are pressed against the side walls 43 of the recess 42 of the core 41 due to the foaming pressure which is produced and increased within the closed space between the skin member 31 and the bottom surface 44 of the core 41. During the foaming, the edge holders 21 are retracted from the die surface 12 into the lower die 11 by the operation of the actuators 23, as shown in FIG. 4. Consequently, the side portions 33 of the skin member 31 which are no longer held by the edge holders are pressed against the side walls 43 of the recess 42 of the core 41 due to the foaming pressure, as can be seen in FIG. 5. Thus, a seal mechanism is established between the core 41 and the skin member 31.

Consequently, the foaming material P continues foaming without being discharged out from the peripheral edge of the skin member 31. Finally, the foaming material P thus foamed forms an integral molding with the skin member 31 and the core 41 due to the adhesiveness of the foaming material during the foaming. The molding has substantially no clearance at the boundary portion of the skin member 31 and the core 41 owing to the close contact therebetween as mentioned above.

Figure 6:
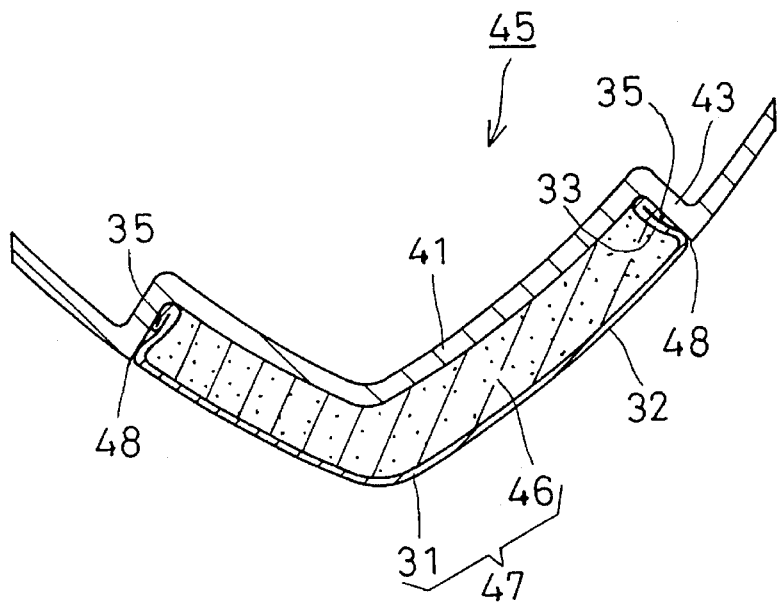
FIG. 6 is a sectional view of an example of a plastic molding having a foam with an outer skin, obtained by a producing method according to the present invention.

The upper and lower molding dies 17 and 11 are opened to remove the molding thus formed. Consequently, a plastic molding 45 having a foam with a skin can be obtained as shown in FIG. 6. In FIG. 6, numeral 46 designates the foam, and 47 the foam assembly of the foam 46 and the skin 31.

The plastic molding 45 has no or little gap at the boundary portions 48 of the skin 31 and the core 41 due to the close contact between the side portions 33 of the skin and the side walls 43 of the recess of the core. Moreover, since the open ends 35 of the recessed grooves are spaced from the surface portion 32 of the skin 31, as mentioned above, the open ends 35 are not exposed at the boundary portions 48, thus resulting in a good appearance of the product (plastic molding). Furthermore, the foam assembly 47 includes no additional base or substrate, unlike the prior art in which the mounting base must be provided, and accordingly is lighter than a conventional foam with a skin.

Figure 7:
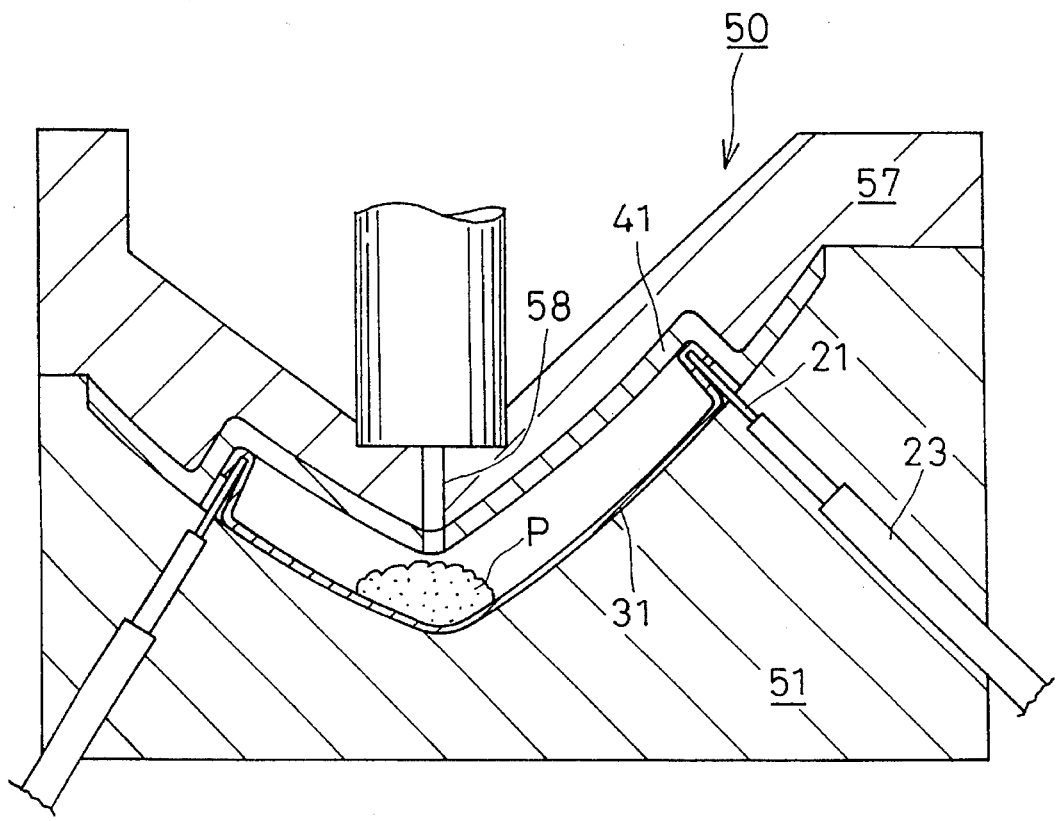
FIG. 7 is a sectional view of a main part of a foaming and molding die apparatus according to another embodiment of the present invention.

FIG. 7 shows another embodiment of a foaming and molding die assembly (apparatus) 50, applied to a closed-pouring system in which the reactive foaming material P is poured in the closed molding dies. The upper die 57 is provided with a pouring port 58 for the foaming material P. The difference between the second embodiment applied to the closed-pouring system and the above-mentioned first embodiment applied to the open-pouring system resides only in the time at which the foaming material P is poured. The numeral 51 designates the lower die.

Moreover, although the foam with the skin is provided on a part of the core in the illustrated embodiments, it is possible to provide the foam with the skin over the entire surface of the core.

Figure 8:
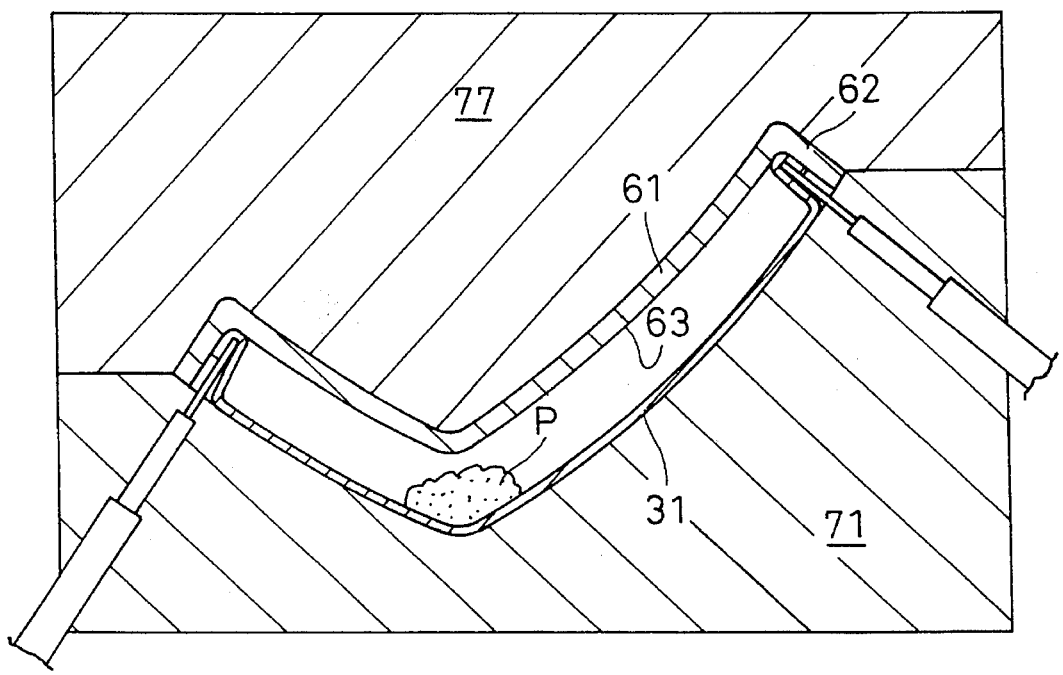
FIG. 8 is a sectional view of a main part of a foaming and molding die apparatus according to still another embodiment of the present invention.
Figure 9:
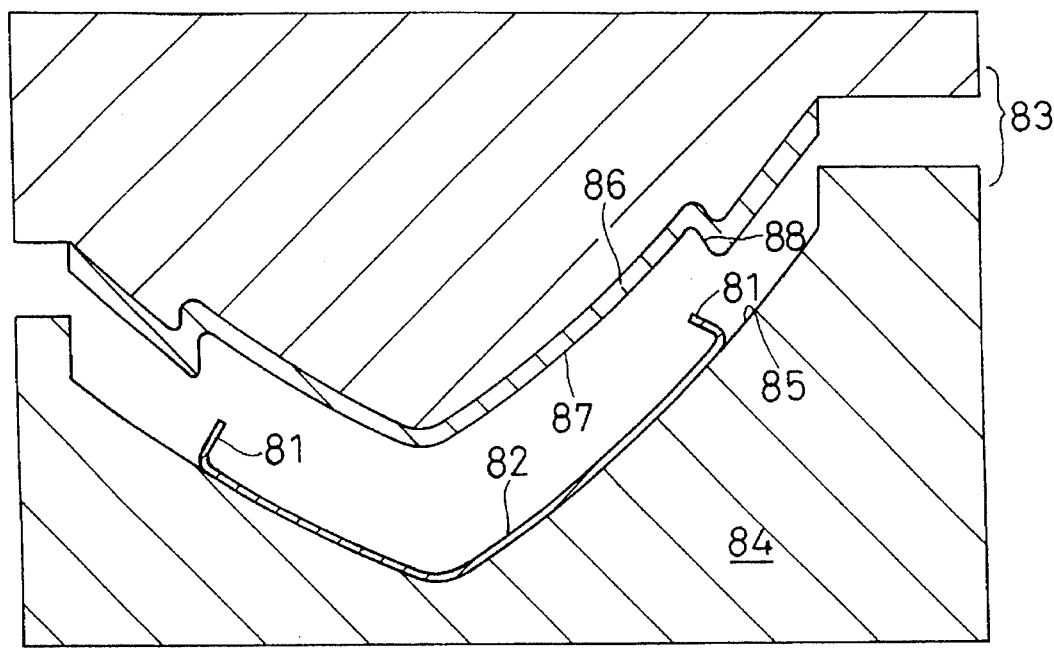
FIG. 9 is a sectional view to explain the operation of a foaming and molding die apparatus according to the present invention; and, FIG. 10 is a perspective view of a known instrument panel.
Figure 10:
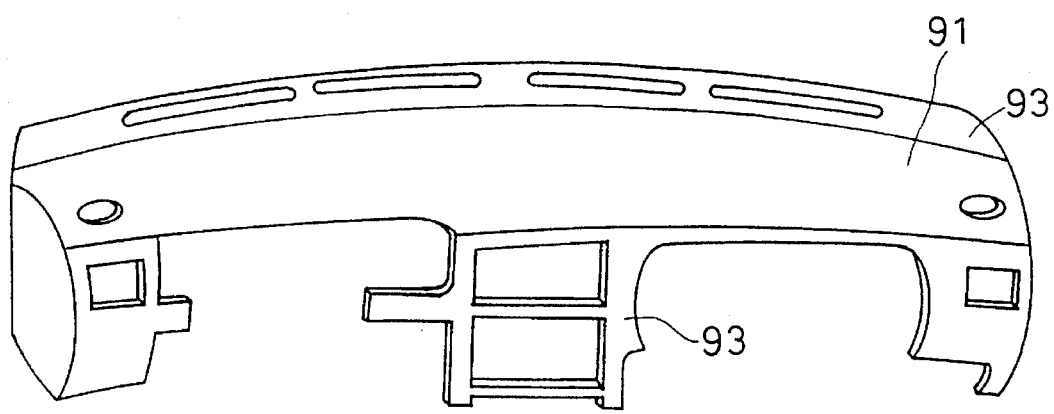

FIG. 8 shows a foaming and molding die assembly which can be adapted to mold a plastic molding having a foam with skin provided on the entire surface of a core. In FIG. 8, the core 61 is bent toward the skin 31 at the peripheral edge thereof to form a circumferential side wall 62 which defines therein an internal space together with the recessed portion 63. Numerals 71 and 72 designate the lower die and the upper die, respectively. The other structure of FIG. 8 is substantially the same as that of FIG. 1.

As can be understood from the above discussion, according to the present invention, a light molding (product) of a good appearance can be easily obtained, wherein there is no or little gap at the boundary portion of the foam with the skin and the core, and no leakage or flow of the foaming material through the boundary portion onto the outer surface of the skin takes place. In addition to the foregoing, since there is no skirt to be cut at the edge of the skin, not only can the skin material be saved, but also no additional cutting operation of the skirt is necessary.

We claim:

1. A method for producing a plastic molding having a foam with a skin on an outer surface of a core wherein a foaming material is foamed in a space defined between a skin member and the core, disposed within a molding die assembly having an upper die and a lower die, comprising the steps of;

disposing the skin member which is provided with side portions and recessed grooves at the edge portions thereof, on the lower die of the molding die assembly, and fitting edge holders projecting from the lower die into the recessed grooves of the skin member to hold the skin member;

disposing the core which is provided with a recess in which the skin member is received, in the molding die assembly;

pouring the foaming material in a space between the skin member and the bottom surface of the core to foam the foaming material; and, retracting the edge holders into the lower die during the foaming before the foaming is completed.

2. A producing method according to claim 1, wherein said core is disposed on the die surface of the upper die of the molding die assembly.

3. A producing method according to claim 1, wherein the side portions of the skin member is formed by bending the end portions of the skin member backward.

4. A producing method according to claim 3, wherein the recessed grooves of the skin member are formed by bending the end portions of the side portions forward.

5. A producing method according to claim 4, wherein said recessed grooves of the skin member are provided with open ends that are spaced from the bottom surface of the skin member.

6. A producing method according to claim 2, wherein said edge holders are in the form of a plate or pin.

7. An apparatus for producing a plastic molding including a lower die on which a skin member which is provided with side portions formed by bending the end portions of the skin member backward and recessed grooves at the edge portions thereof, formed by bending the end portions of the side portions forward is disposed, and an upper die on which a core which is provided with a recess in which the skin member is received is disposed, wherein a foaming material is foamed between the skin member and the bottom surface of the core, comprising;

edge holders provided in the lower die having a die surface, said edge holders being provided with holding members which can be selectively fitted in the recessed grooves of the skin member to hold the skin member, and means to enable the holding members to be projected from and retracted into the die surface of the lower die.

8. A producing apparatus according to claim 7, wherein said edge holders are in the form of a plate or pin.

9. A producing apparatus according to claim 8, further comprising actuators for actuating the edge holders.

10. A producing apparatus according to claim 8, wherein said actuators are comprised of hydraulic cylinder devices.

* * * * *